(12) United States Patent
Werny et al.

(10) Patent No.: US 9,765,857 B2
(45) Date of Patent: Sep. 19, 2017

(54) CHAIN GUIDE ELEMENT

(71) Applicant: SCHAEFFLER TECHNOLOGIES AG & CO. KG, Herzogenaurach (DE)

(72) Inventors: Pierre Werny, Strasbourg (FR); Stephan Penner, Bühl (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 15/023,375

(22) PCT Filed: Aug. 21, 2014

(86) PCT No.: PCT/DE2014/200416
§ 371 (c)(1),
(2) Date: Mar. 19, 2016

(87) PCT Pub. No.: WO2015/039661
PCT Pub. Date: Mar. 26, 2015

(65) Prior Publication Data
US 2016/0208891 A1    Jul. 21, 2016

(30) Foreign Application Priority Data
Sep. 20, 2013 (DE) .......... 10 2013 218 942

(51) Int. Cl.
F16H 7/18 (2006.01)
B62J 13/00 (2006.01)
(Continued)

(52) U.S. Cl.
CPC .......... F16H 7/18 (2013.01); F16H 9/18 (2013.01); F16H 9/24 (2013.01); F16H 2007/185 (2013.01)

(58) Field of Classification Search
CPC ...... F16H 7/18; F16H 9/18; F16H 2007/0872; F16H 7/08; F16H 9/16
(Continued)

(56) References Cited

U.S. PATENT DOCUMENTS

| 952,647 | A | * | 3/1910 | Sorensen | ......... B62J 13/00 |
| | | | | | 474/145 |
| 1,194,133 | A | * | 8/1916 | Brown | ......... F16H 7/18 |
| | | | | | 474/140 |

(Continued)

FOREIGN PATENT DOCUMENTS

| DE | 100 17 005 A1 | 10/2000 |
| DE | 10 2009 019 069 A1 | 11/2009 |

(Continued)

Primary Examiner — Henry Liu
(74) Attorney, Agent, or Firm — Alfred J. Mangels

(57) ABSTRACT

A chain guide element having a first guide rail and a second guide rail which is spaced from the first guide rail to guide a moving chain therebetween. On each lateral side of the chain guide element connecting elements connect the two guide rails in spaced relationship to slidably receive a moving chain. First supporting elements are positioned on the laterally arranged connecting elements that connect the first and second guide rails, and second supporting elements are carried by a stationary component to cooperate with the first supporting elements so that the chain guide element is pivotable and is linearly movable relative to the second supporting elements.

13 Claims, 4 Drawing Sheets

(51) Int. Cl.
*F16D 1/00* (2006.01)
*F16H 57/02* (2012.01)
*F16H 9/18* (2006.01)
*F16H 9/24* (2006.01)

(58) Field of Classification Search
USPC .................................................. 474/140, 145
See application file for complete search history.

(56) References Cited

U.S. PATENT DOCUMENTS

| | | | | |
|---|---|---|---|---|
| 3,111,039 A * | 11/1963 | Peras | ......................... | F01L 1/02 |
| | | | | 474/111 |
| 3,136,169 A * | 6/1964 | Karger | ...................... | F16H 7/08 |
| | | | | 474/111 |
| 4,642,073 A * | 2/1987 | Restelli | ..................... | F16H 7/08 |
| | | | | 474/111 |
| 6,435,994 B1 * | 8/2002 | Friedmann | ................ | F16H 7/18 |
| | | | | 474/111 |
| 7,354,364 B2 * | 4/2008 | Glas | ........................ | F16H 59/36 |
| | | | | 474/140 |
| 8,057,336 B2 * | 11/2011 | Wodtke | ..................... | F16H 7/18 |
| | | | | 474/111 |
| 8,376,883 B2 * | 2/2013 | Inoue | ........................ | F16H 9/24 |
| | | | | 474/109 |
| 9,382,982 B2 * | 7/2016 | Werny | ....................... | F16H 7/18 |
| 9,458,916 B2 * | 10/2016 | Garcia | ...................... | F16H 7/18 |
| 2004/0142792 A1 * | 7/2004 | Glas | ........................ | F16H 59/36 |
| | | | | 477/70 |
| 2011/0152019 A1 * | 6/2011 | Gantner | .................... | F16H 9/24 |
| | | | | 474/8 |
| 2011/0244999 A1 * | 10/2011 | Nakamura | ................ | F16H 9/18 |
| | | | | 474/91 |
| 2014/0235390 A1 * | 8/2014 | Urbanek | ................... | F16H 7/18 |
| | | | | 474/140 |
| 2015/0176684 A1 * | 6/2015 | Werny | ....................... | F16H 7/18 |
| | | | | 474/140 |
| 2016/0040762 A1 * | 2/2016 | Garcia | ...................... | F16H 7/18 |
| | | | | 474/140 |

FOREIGN PATENT DOCUMENTS

| | | |
|---|---|---|
| DE | 10 2013 201 541 A1 | 8/2013 |
| EP | 2 372 189 A1 | 10/2011 |

* cited by examiner

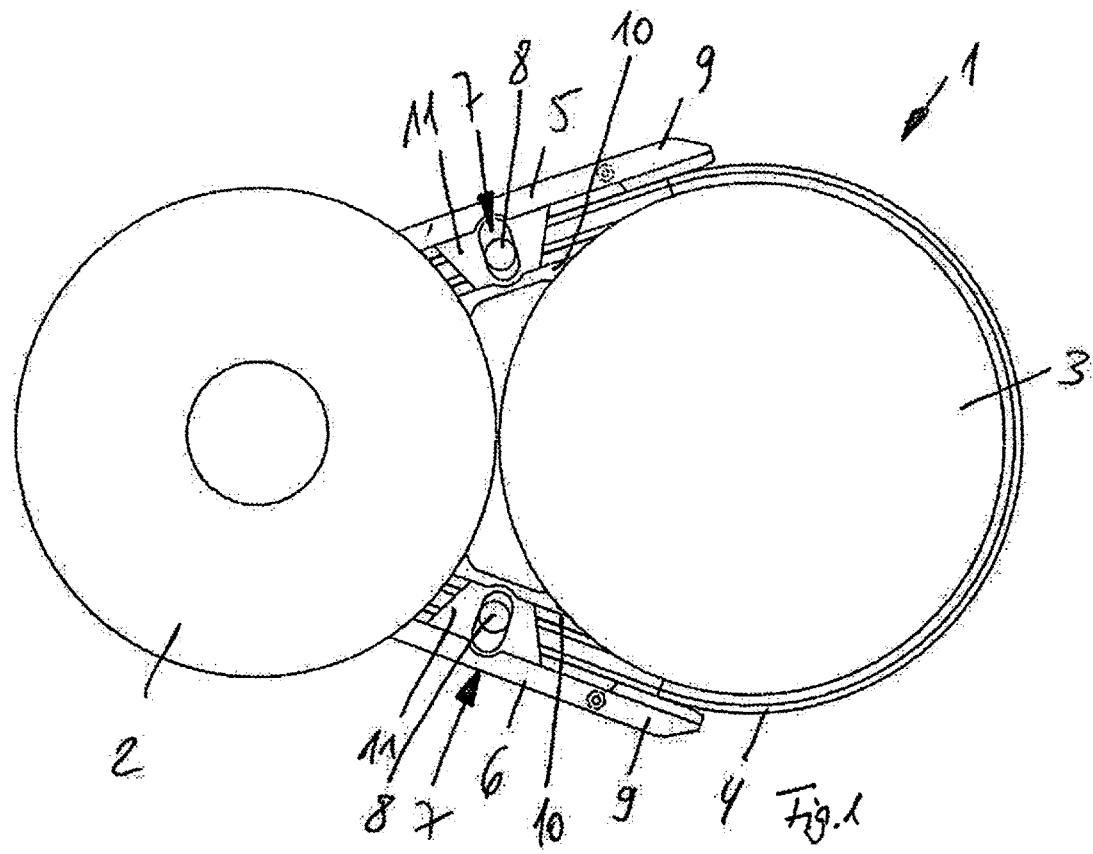
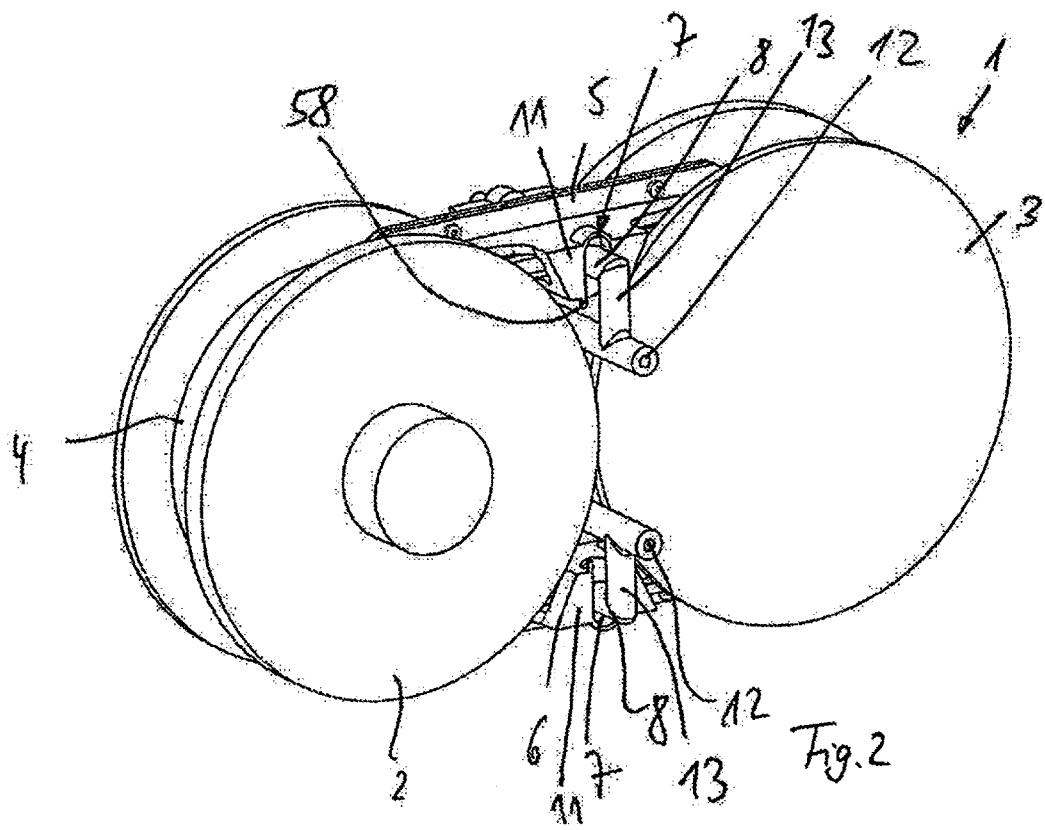

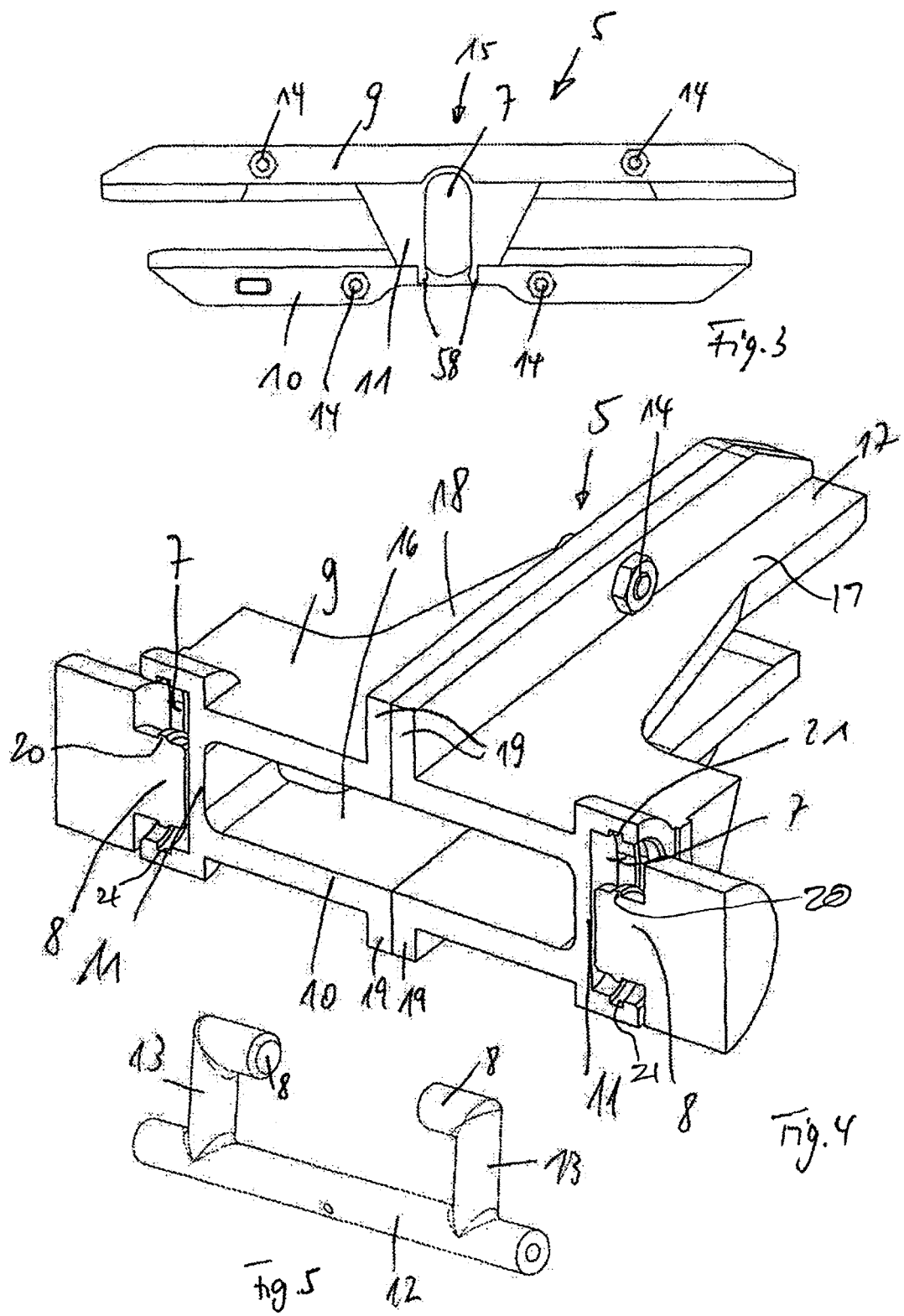

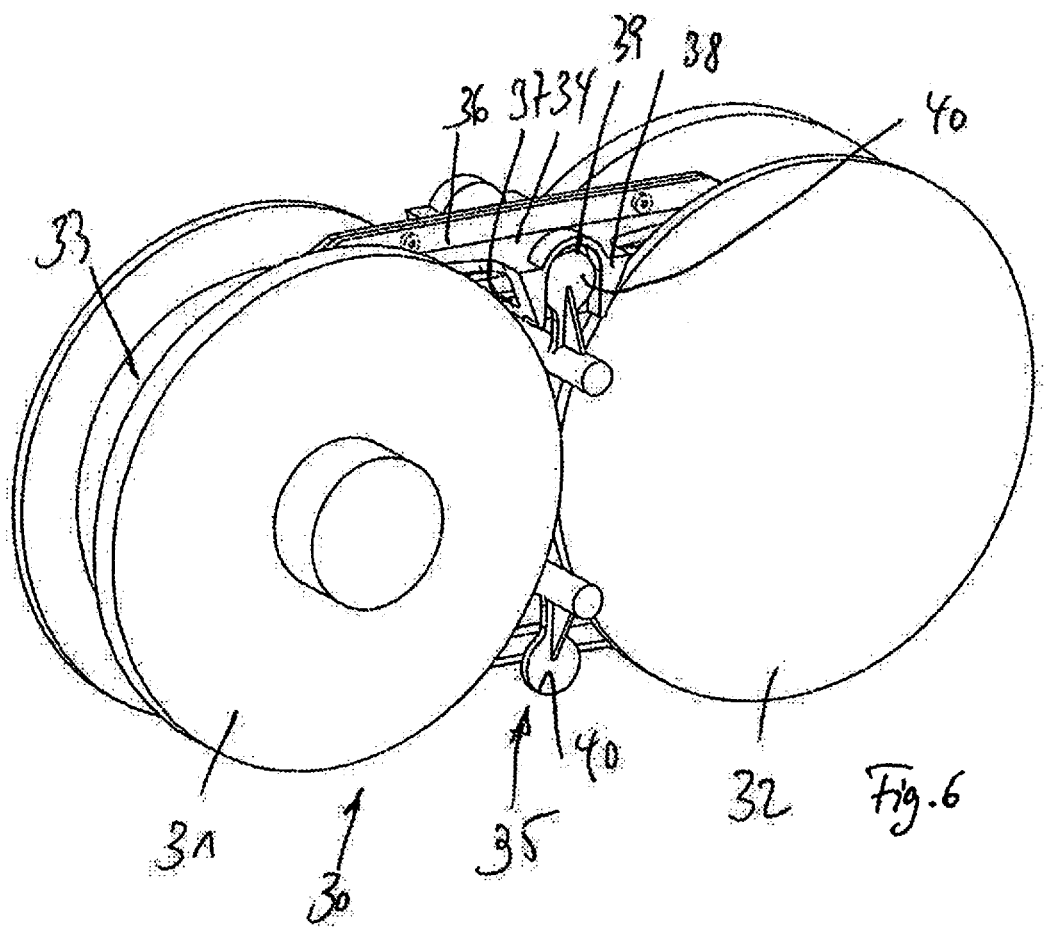
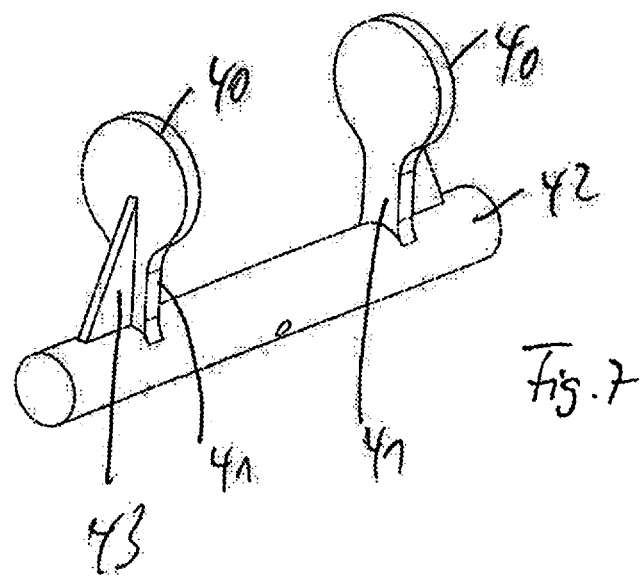

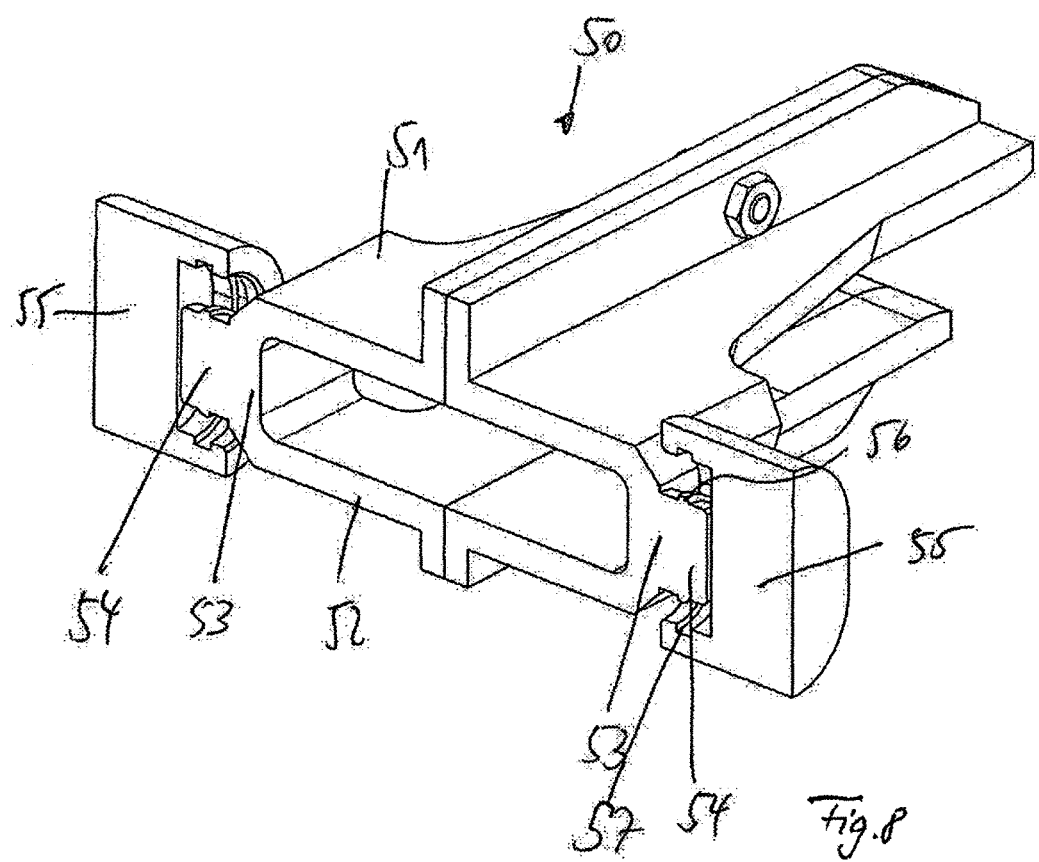

CHAIN GUIDE ELEMENT

CROSS-REFERENCE TO RELATED APPLICATION

This application is the U.S. national phase application under 35 U.S.C. §371 of International Application Serial No. PCT/DE2014/200416, having an international filing date of 21 Aug. 2014, and designating the United States, which claims priority based upon German Patent Application No. DE 10 2013 218 942.7, filed on 20 Sep. 2013, the entire contents of each of which applications are hereby incorporated by reference herein to the same extent as if fully rewritten.

BACKGROUND OF THE INVENTION

Field of the Invention

The present invention relates to a chain guide element, in particular for a CVT transmission of a motor vehicle.

Description of the Related Art

Chain guide elements are known in CVT transmissions according to the prior art to guide the chain and damp strand vibrations of the chain.

For example, DE100 17 005 A1 discloses a continuously adjustable, chain-driven conical-pulley transmission as a CVT transmission in which a chain guide element is made as a receiving rail. The chain guide element includes an upper and a lower rail, which are connected to each other by means of at least one lateral arm as a spacer, while the chain runs between the two rails in the longitudinal direction of the rails.

The chain guide element is located within the transmission between two conical disk pairs, and is situated so that it can be pivotable and linearly movable by means of a combined pivoting and translatory support, so that the chain guide is able to adapt to the particular course of the chain when the transmission ratio of the transmission is changed by changing the running radii of the chain in the conical disk pairs. At the same time, the chain guide has a receptacle that opens downward, below the lower rail, which can be placed on a guide tube or bolt that is positioned parallel to the axes of the conical disk pairs and between them. Downward in this connection means directed toward the center plane which runs through the axes of the two conical disk pairs.

If the chain changes from one extreme position to the other extreme position, the chain guide element describes a motion which consists of a combination of a rotational motion around the guide tube and a linear motion. This leads to disadvantages, which are also caused in particular by the fact that a guide tube crossing the construction space or a bolt is used to support the chain guide element. The use of the construction space by the receptacle located below the rails means that the construction space for the rails and the connecting element is limited, which results in these components having to be of relatively narrow design, which has a negative effect on their rigidity. This also has negative effects on the damping of strand vibrations of the first and second orders, and on the fabrication.

An object of the present invention is to create a chain guide element by means of which improved vibration damping of a chain strand is achievable, and which is nevertheless simply and economically constructed.

SUMMARY OF THE INVENTION

One exemplary embodiment of the invention relates to a chain guide element having a first rail and a second rail spaced from the first rail, there being in each case on both sides of the rails lateral connecting elements that connect the two rails to each other. Two supporting means are provided in order to support the rails so that they are pivotable and linearly movable. A first supporting means is positioned on the lateral connecting elements, and a second supporting means works together with the first supporting means, both of which are positioned to the side of the rails. This results in the supporting means being positioned at the level of the chain which is running between the rails of the chain guide, and the pivot point being located at the level of the chain so that the pivoting motion of the chain guide is essentially only a rotational motion. It also results in the supporting means being provided to the side of the rails, and thus to the side of the chain, so that more construction space is available for the rails and for the connecting element, and so that the rails and connecting element can be of a more solid design, which has a positive effect on the rigidity of the rails and on the ease of fabrication.

Accordingly, it is at the same time especially advantageous if the first and second supporting means are positioned essentially at the level of the chain in the chain guide element It is also advantageous if the first supporting means in each case have a receptacle which is engaged in each case by a projection of the first supporting means, or if the first supporting means in each case have a projection which in each case engages a receptacle of the second supporting means. Secure support of the chain guide element by means of the first and second supporting means is achieved thereby. Accordingly, the chain guide element can pivot around the projection by means of the receptacle. If the receptacle is elongated, a radial equalization can also occur.

It is also advantageous if the projection and the receptacle are positioned essentially at the level of the chain in the chain guide element.

In addition, it is useful if the second supporting means are connected on an axis which is spaced from the first and second supporting means. This enables the second supporting means to be connected via the axis with a transmission housing. If the axis runs in the zone between the conical disk pairs of the chain-driven, conical-pulley transmission, then construction space can also be saved.

Furthermore, it is advantageous if the second supporting means protrude downward from the axis as projections, the projections being in the form of pegs extending in the axial direction. The engagement with the receptacles then takes place in the axial direction.

It is also advantageous if the second supporting means protrude downward from the axis as projections, the projections being in the form of pan-like plates extending in the radial direction. As a result, engagement with the receptacles can take place essentially from the radial direction.

It is especially advantageous if the second supporting means are designed as pockets which are open in the axial direction, and the first supporting means are designed as projections which engage the pockets in the axial direction.

It is also especially advantageous if the radial dimension of the receptacle is greater than the radial dimension of the projection engaging the receptacle.

Furthermore, it is useful if a projection has an encircling, ring-shaped bulge, while a receptacle has a ring-shaped groove to receive the ring-shaped-bulge.

The present invention will be explained in greater detail below on the basis of preferred exemplary embodiments, in combination with the corresponding figures.

BRIEF DESCRIPTION OF THE DRAWINGS

The drawing figures show the following:

FIG. 1 is a schematic side view of a chain-driven converter having a chain guide element, FIG. 2 is a schematic perspective view of a chain-driven converter having a chain guide element, FIG. 3 is a side view of a chain guide element, FIG. 4 is a perspective view in a cutaway of a chain guide element, FIG. 5 is a supporting element, FIG. 6 is a schematic perspective view of a chain-driven converter having a chain guide element, FIG. 7 is a supporting element, and FIG. 8 is a perspective view of a cutaway chain guide element.

DESCRIPTION OF THE PREFERRED EMBODIMENTS

FIG. 1 shows a chain-driven converter 1, in particular of a continuously variable transmission or CVT transmission, having a first conical disk pair 2 and a second conical disk pair 3. Positioned between the two conical disk pairs 2,3, as an endless torque-transmitting means, is a chain 4 encircling the two conical disk pairs 2,3. To guide the chain 4 between the two conical disk pairs 2,3, a first chain guide element 5 and a second chain guide element 6 are provided, which guide the chain in passing from the first conical disk pair 2 to the second conical disk pair 3 and vice versa. The chain guide elements 5,6 are supported by supporting means 7,8 so that they are pivotable and linearly movable, so that the arrangement of the respective chain guide elements 5,6 is able to adapt to the course of the chain 4.

The chain guide elements 5,6 include a first rail 9 and a second rail 10, which are spaced from each other to form an intermediate space in which the chain 4 runs within the chain guide elements 5,6. The two rails 9,10, the first rail 9 and the second rail 10, are connected with each other laterally by means of connecting elements 11 in order to fix the rails 9,10 relative to each other.

The supporting means 7,8 include first supporting means 7, which are positioned to the side on the respective connecting element 11, and second supporting means 8, which work together with the first supporting means to support the chain guide element. The second supporting means 8 are positioned here so that they engage the first supporting means 7, or the first supporting means 7 engage the second supporting means 8.

FIG. 2 shows the exemplary embodiment of FIG. 1 in a perspective. The chain-driven converter 1 has a first conical disk pair 2 and a second conical disk pair 3, there being a chain 4 encircling the conical disk pairs 2,3 as an endless torque-transmitting means. Between the conical disk pairs 2, 3 chain guide elements 5, 6 are provided, which are positioned in respective opposing spaces, for example triangular, between the conical disk pairs 2,3, and protrude part way into the gap between the conical disk pairs 2, 3.

The first supporting means 7 are in the form of cutouts, which are formed in the lateral connecting elements 11 in order to receive a projection which forms the second supporting means 8, and which is oriented in the axial direction of the conical disks. The dimension of the cutout 7 is oval and elongated, so that the second supporting means 8 also has room for radial displacement relative to the axial direction of the conical disks.

The second supporting means 8 is formed by a projection or peg protruding in the axial direction, which is connected to an axis 12 by means of a connecting element 13. The chain guide elements 6,7 can pivot or move linearly relative to the second supporting means 8, in order to follow the position of the chain in encircling the conical disk pairs 2, 3.

FIGS. 3,4 show the chain guide elements 5 and 6 in a side view and a perspective partial view, respectively. The chain guide element 5 has a first rail 9 and a second rail 10, which are spaced apart from each other. The rails extend in the lateral direction. Positioned to the side of the rails 9,10 in each case are connecting elements 11, which connect the first rail 9 to the second rail 10 laterally. In the central region 15, the rails 9,10 form an essentially rectangular channel 16 with the respective lateral connecting elements 11, and through which the chain runs.

The rails 9,10 extend in the longitudinal direction of the chain. As can be seen in FIG. 4, the chain guide elements 5,6 are designed in two parts, with two shells 17,18 forming the chain guide elements 5,6, with the upper rail 9 and the lower rail 10 being divided in half in the longitudinal direction, and together with a connecting element 11 forming a shell 17 and 18 respectively. To join the two shells 17,18, connecting means 14, such as for example screws or clips etc., are provided, which are passed through flanges 19 which extend upwardly from the rails 9,10.

It can be seen in FIGS. 3 and 4 that the first supporting means 7 and the lateral connecting elements 11 are integrated, while the second supporting means 8 work together with the first supporting means 7 to support the chain guide elements 5,6. The first supporting means 7 are designed here as cutouts, which are open in the axial direction, relative to the conical disk pair axes, and are engaged by the second supporting means 8 designed as projections.

In this connection, it is evident in FIG. 4 that the second supporting means 8, designed as projections, have encircling, ring-shaped annular bulges 20, which correspond to ring-shaped, encircling annular grooves 21 of the first supporting means 7, in order to achieve securement when annular ridges 20 engage the annular grooves 21.

FIG. 5 shows a second supporting means 8 having an axle 12, the supporting means 8 being connected to the axle 12 by means of connecting elements 13. The two second supporting means 8 extend from the connecting elements 13 in the axial direction, relative to the conical disk pair axes and face toward each other. The connecting elements 13 connect the two supporting means 8 to the axle 12, which is oriented in the axial direction, and the connecting elements 13 extending from the axle 12 in the radial direction. The axle 12 extends outwardly in the axial direction relative to the connecting elements 13, in order to be situated and supported, for example in receptacles found in a transmission housing.

FIG. 6 shows a chain-driven converter 30 which has a first conical disk pair 31 and a second conical disk pair 32, while a chain 33 encircles the two conical disk pairs 31,32. In addition, chain guide elements 34,35 are provided. Only chain guide element 34 is shown, while chain guide 35 has not been shown for better visibility. Alternatively, only one chain guide element can be provided with a chain-driven converter.

The chain guide elements 34,35 in turn have rails 36, 37, which are designed to be set apart from each other, and which are connected with each other by means of lateral connecting elements 38. First supporting means 39 are formed on the lateral connecting elements 38 as receptacles, which are engaged by second supporting means 40. As shown in FIG. 7, the second supporting means 40 are formed as pan-like, circular plates, which are connected to an axle 42 by means of a link 41. For stability, the second supporting means 40 formed as a pan-like plate is connected to the axle 42 by means of a bracing element or gusset 43, which is connected both to the axle 42 and to the pan-like, circular plate 40 and has a triangular form. The receptacle that receives second supporting means 40, in this case, is approximately circular.

FIG. 8 shows another alternative configuration of a chain guide element 50, having a first rail 51 and a second rail 52 which are connected with each other by means of lateral connecting elements 53. The first supporting means 54 are connected to the lateral connecting elements 53 or are formed in a single piece with them, the first supporting means being formed as pegs or projections extending in the axial direction, relative to the conical disk pair axes. The second supporting means 55 are formed as receptacles, which are open in the axial direction to receive the first supporting means 54, which are formed as projections extending axially from lateral connecting elements 53.

The projections of the first supporting means 54 include ring-shaped, annular bulges 56, which correspond to ring-shaped, annular grooves 57 in the second supporting means 55 in order to ensure reliable guidance of the projections in the receptacles.

In accordance with the invention, it is advantageous to integrate the support of the chain guide element into a housing of the transmission. In so doing, the second supporting means is preferably integrated into the housing of the transmission. Thus, the second supporting means can be received, for example, into a receptacle in the transmission housing.

The receptacle, as the first or second supporting means, can be designed as a largely closed end receptacle, which is open in the lateral direction to be able to receive the respective other supporting means. Alternatively, the inner circumference of the receptacle opening can be formed so that it is open on one end or on two ends, so that the other supporting means can be inserted laterally into the receptacle. FIGS. 2, 3, and 6 show receptacles which are open on one end, and which are formed so that they are open radially on the inside of lateral connecting element 11. Thus, the alternative configurations can be formed such that the receptacles can be completely closed on their circumference, or, alternatively, are open on one or both ends.

In the case of the open receptacles, securing elements 58 (see FIGS. 2 and 3) can be provided, for example as flexible projections or catch tabs, which serve to protect against loss and are intended to prevent a supporting means from slipping out of the receptacle. To that end, in FIGS. 2 and 3 securing elements 58 in the form of projections are provided, which limit the opening width of the receptacle and are elastically deformable, in order to allow a supporting means to be inserted into and retained within the receptacle.

The invention claimed is:

1. A chain guide element, said chain guide element comprising:
   a first rail and a second rail spaced from the first rail to provide a pair of opposed guide surfaces for slidably receiving therebetween and guiding a longitudinally moving chain,
   a lateral connecting element on each of two lateral sides of the first and second rails, which connecting elements connect respective lateral sides of the first and second rails with each other to form the chain guide element,
   wherein first supporting means are provided in each of the lateral connecting elements to support the first and second rails by means of second supporting means so that the chain guide element is pivotable about a pivot axis that extends transversely to longitudinal movement of the chain and can move linearly in a radial direction relative to the pivot axis,
   wherein the first supporting means are positioned on the lateral connecting elements and the second supporting means cooperate with the first supporting means and are positioned on lateral sides of the first and second rails to engage with the first supporting means and enable pivotal and linear movement of the chain guide element relative the pivot axis.

2. A chain guide element according to claim 1, wherein the first and second supporting means are positioned laterally of sides of the chain as the chain is received in the chain guide element.

3. A chain guide element according to claim 1, wherein the first supporting means include a receptacle which is engaged in each case by a projection carried by the second supporting means.

4. A chain guide element according to claim 3, wherein the projection and the receptacle are positioned laterally of sides of the chain as the chain is received in the chain guide element.

5. A chain guide element according to claim 1, wherein the second supporting means are positioned on and connected to an axle which is spaced from the first and second supporting means.

6. A chain guide element according to claim 5, wherein the second supporting means are spaced from the axle and include projections that extend in the axial direction of the axle.

7. A chain guide element according to claim 5, wherein the second supporting means are spaced from the axle and are formed as circular plates that extend in a radial direction relative to the axis of the axle.

8. A chain guide element according to claim 1, wherein the second supporting means are formed as pockets which are open in the axial direction, and the first supporting means are formed as projections that are axially received in the pockets.

9. A chain guide element according to claim 3, wherein a radial dimension of the receptacle is greater than a radial dimension of the projection that is received in the receptacle.

10. A chain guide element according to claim 3, wherein the projection has an encircling, ring-shaped annular bulge and the receptacle has a ring-shaped annular groove to receive the annular bulge.

11. A chain guide element according to claim 1, wherein the first supporting means include a projection which engages a receptacle carried by the second supporting means.

12. A chain guide element according to claim 11, wherein the projection and the receptacle are positioned laterally of sides of the chain as the chain is received in the chain guide element.

13. A chain guide element according to claim 11, wherein a radial dimension of the receptacle is greater than a radial dimension of the projection that is received in the receptacle.

* * * * *